Patented June 22, 1926.

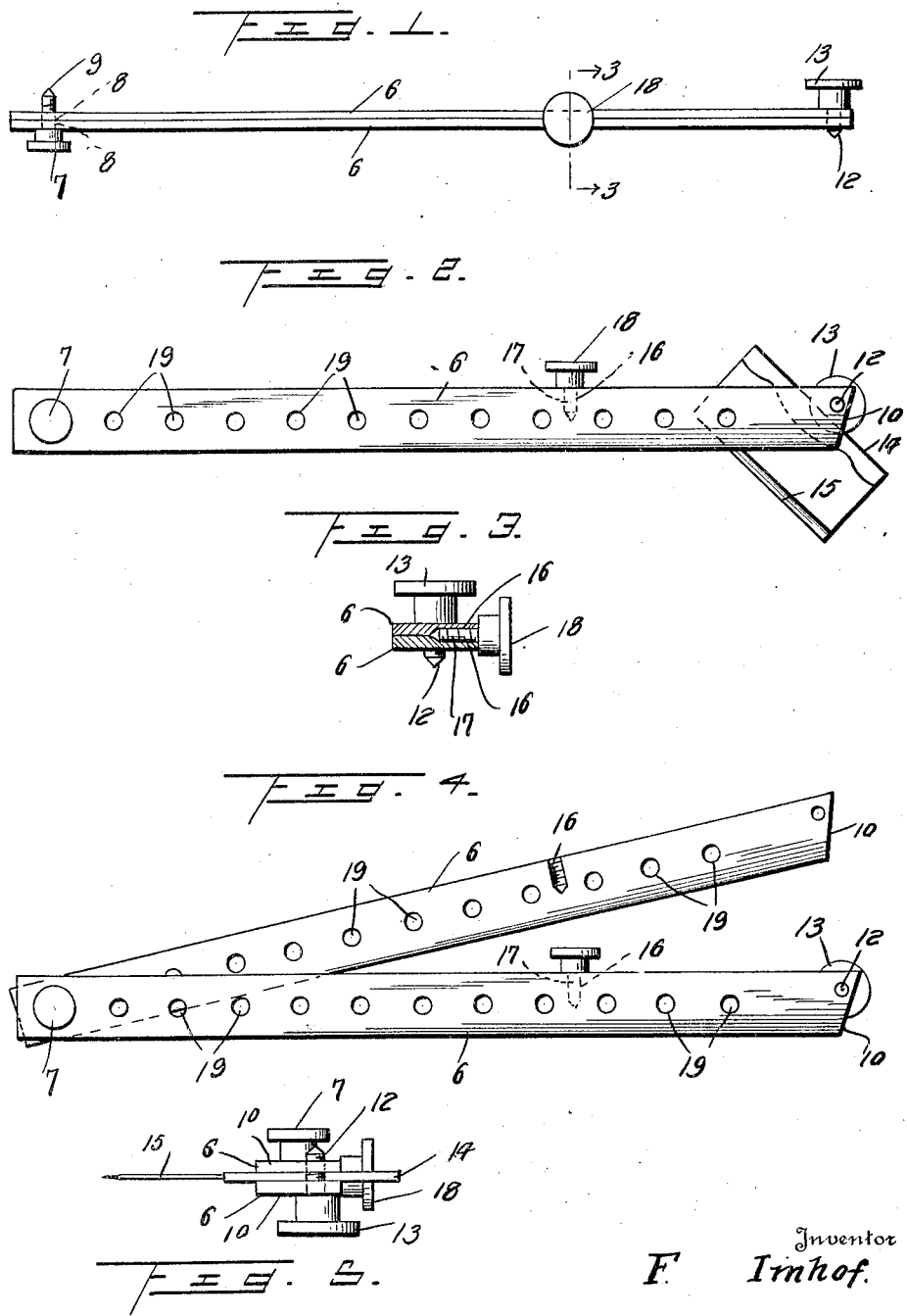

1,590,031

UNITED STATES PATENT OFFICE.

FRANK IMHOF, OF ALTANTIC CITY, NEW JERSEY.

CUTTING TOOL.

Application filed November 26, 1921. Serial No. 517,866.

This invention relates to a combination plotting and cutting tool for use by artists or sign painters in connection with mats and other board material usually capable of cutting by means of a penknife.

The invention aims to provide such a tool having arms which may be used to secure a cutting blade in place and serve as a handle therefor, and which arms may also serve as straight edges for rules and as a compass in combination with a marker, and further to provide a novel finger rest in connection with the arms.

Additional objects and advantages will become apparent from a consideration of the description following hereinafter taken in connection with the accompanying drawing illustrating one practical embodiment and wherein:—

Figure 1 is a side elevation of the tool.

Fig. 2 is a plan view of the tool with said cutting blade in place;

Fig. 3 is a cross-sectional view on the line 3—3 of Fig. 1 taken through the finger rest;

Fig. 4 is an elevation showing the arms in separated relation; and

Fig. 5 is an end elevation showing a cutter in place.

Like reference characters designate like or similar parts throughout the different views.

In reducing the invention to practice, two arms, substantially similar, are provided at 6. At one end a set-screw 7 connects said arms together, passing through openings 8 and 8ª therein, the former of which is screw-threaded. The shank of the set-screw 7 projects beyond one of the arms and is provided with a point or sharpened end as at 9. At the other end, arms 6 are preferably beveled as at 10 and have openings 11 and 11ª through which a shank 12 of a set-screw 13 passes, the former opening having screw-threads detachably engaged by those of the shank.

The construction described may be utilized to hold a cutting blade like that illustrated at 14. Blade 14 has its cutting edge at 15 and may be an ordinary safety-razor blade as illustrated. This blade 14 is not connected to the arms but is merely clamped rigidly between them by the set-screw 13, hence said blade is removable when desired. I find in practice that the best results are accomplished when the cutting edge 15 of the blade is disposed angularly as shown in the drawing.

The contacting faces of the arms 6 are provided with semi-cylindrical recesses at 16 suitably screw-threaded so as to collectively form a screw hole. Into such screw hole, when the arms or blades 6 are in contact with each other, a set-screw shank 17 is threaded, the head of which at 18 forms a finger rest. Aside from a finger rest being provided, the interengagement of the threads of shank 17 with those at 16 necessitates perfect registry of the threads of the opposed recesses and thus perfect registry of the side edges of the arms 6, which is advantageous for ruling purposes.

A longitudinal row of openings or apertures 19 is provided in each arm 6.

In use, with the blade 14 secured in place and with the finger rest 18 in place, as shown, the arms 6 may be grasped as a handle with the index finger resting on the finger rest 18, the blade may be actuated as a knife so that the edge 15 will cut. I have found the invention highly advantageous in cutting sign mats, compo and other boards. It is obvious, of course, that this knife may be used to cut any suitable material. The arms 6 may be used along their side edges as ordinary rules or straight edges in which event, the blade 14 is preferably removed. Also by removal or adjustment of one of the set-screws 7 or 13, one arm 6 may be adjusted to a position at an angle relative to the other to facilitate the drawing of angle lines.

In addition, when desired, one of the arms 6 may be anchored to a board or the like by extending the shanks 9 and 12 thereinto at their pointed ends, it being understood that set screw 13 is to be inserted in arm 6 in an inverted position from that shown in the drawings when the device is used in this manner. Thereafter the other arm 6 may be swung relatively thereto with a pencil inserted in any selected opening 19 in order that the device may function as a circle scriber or compass.

As merely one practical embodiment has been illustrated and described, it is to be understood that changes in the details may be resorted to within the spirit and scope of the claim.

I claim as my invention:—

A tool of the character described comprising relatively movable arms having mating semi-cylindrical threaded recesses in their abutting faces together forming a threaded bore when the arms are secured together and adapted to receive a threaded shank of a finger rest, a cutting blade adapted to be inserted between said arms, and means to clamp said blade between the arms.

In testimony whereof I affix my signature.

FRANK IMHOF.